July 6, 1965
K. A. SCHAFER
3,193,435
LAMINATED ARTICLES HAVING DEEPLY EMBOSSED
SURFACES AND METHOD OF MAKING SAME
Filed Aug. 16, 1961
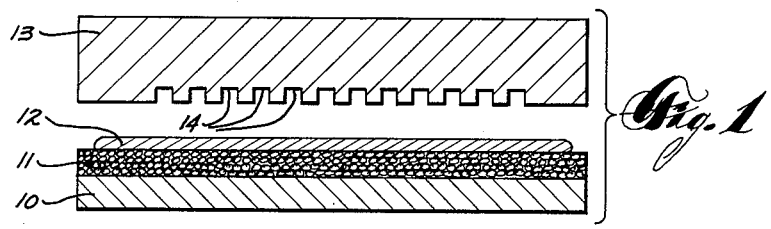
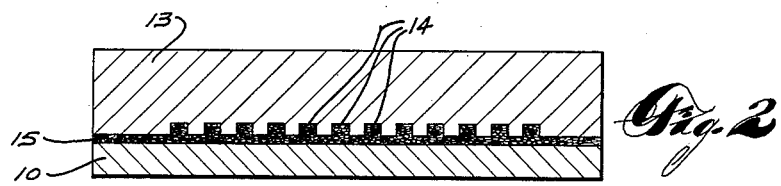
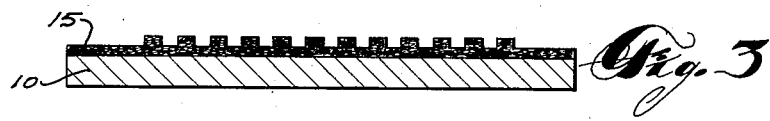
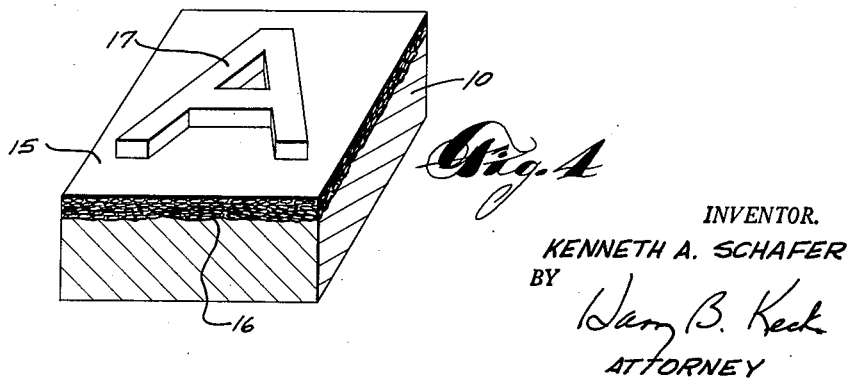
INVENTOR.
KENNETH A. SCHAFER
BY
*Harry B. Keck*
ATTORNEY

United States Patent Office 3,193,435
Patented July 6, 1965

3,193,435
LAMINATED ARTICLES HAVING DEEPLY EMBOSSED SURFACES AND METHOD OF MAKING SAME
Kenneth A. Schafer, Cedarburg, Wis., assignor to Freeman Chemical Corporation, Port Washington, Wis., a corporation of Delaware
Filed Aug. 16, 1961, Ser. No. 131,845
13 Claims. (Cl. 161—40)

This invention relates to laminated articles such as panels having deeply embossed resinous surfaces.

More particularly this invention relates to laminated articles having as a surface coating a compressed sheet of open, connected cellular foamed polyurethane which has its void spaces filled with a non-foaming thermosetting resinous composition which has been cured to a hardened, thermoset condition while the said foamed polyurethane was maintained under compression within a molding apparatus having depressions in its molding surface corresponding to the deep embossing of the desired laminated article.

According to this invention, sheets of open connected cellular foamed polyurethane are inserted into molding apparatus together with reinforcing elements which may comprise reinforced glass fiber mats, glass fiber woven fabrics, relatively stiff structural backing elements such as wood, pressed wood, cardboard, cement, metal glass and the like. The foamed polyurethane sheet is saturated with a thermosetting resinous composition in liquid form and the saturated foamed polyurethane sheet is compressed by means of an embossed molding element. The extreme compressibility of the foamed polyurethane permits it to enter into the deep embossed surfaces of the molding and to fill substantially entirely the grooves of the embossed molding surface. While the saturated foamed polyurethane sheet is maintained under compression as described, the thermosetting resinous composition is cured to a hardened thermoset condition. The foamed polyurethane sheet is confined within the hardened resinous coating.

Where the thermosetting resinous composition is opaque, the resulting surface has an attractive grained configuration corresponding to the cellular character of the foamed polyurethane.

Where the foamed polyurethane has relatively large cells, the resulting surface presentation is marbleized with the opaque thermosetting resinous composition being grained by the foamed polyurethane which is in surface abutment. Where the foamed polyurethane has relatively small cells, the resulting surface presentation resembles fine-grained leather having as a fundamental background the color of the opaque thermosetting resinous composition.

Typical thermosetting resinous compositions which are useful in the present invention include unsaturated polyester resins and epoxy resins as well as phenol-formaldehyde resins and urea-formaldehyde resins.

Resinous foam

The foamed resinous material, as heretofor mentioned, is preferably foamed polyurethane having open, connected cells. Other materials which have been investigated have been found to be undesirable for want of one or more of the following features.

The foamed resin must possess:

(1) Open-celled configuration;
(2) Flexibility;
(3) Elasticity;
(4) Ready compressibility; and
(5) Wettability with the thermosetting resinous composition.

Polyurethane foam is eminently satisfactory in the above-listed properties where the thermosetting resinous composition is unsaturated polyester resin or epoxy resin.

The preferred foamed resin has cells of substantially uniform diameter in the range of 0.001 to 0.5 inch. The material is provided in sheet form having a thickness from about 0.05 to 2.0 inches. Such sheets may be readily compressed or substantially flattened to a minor fraction of their uncompressed thickness. The cells of the foamed polyurethane must be open and connected. Polyurethane foams having open, connected cell structures are described in U.S. Patent 2,961,710 and Canada Patent 620,248. The cell-wall breakdown described in these references is accomplished through the action of organic solvents and inorganic reagents acting upon the customary closed-cell polyurethane foams.

Thermosetting resins

Unsaturated polyester resins are well known in the art as a thermosetting resinous material. Such resinous compositions are widely utilized in the fabrication of furniture, automotive vehicle parts such as fenders and bodymoldings, boat hulls, machinery cases, machinery covers, helmets and the like. Frequently the unsaturated polyester resins are utilized in combination with fibrous reinforcing materials such as glass fiber mats, glass fiber fabrics, sisal fibers, hoghair fibers and the like. The unsaturated polyester resins usually are solutions of unsaturated polyesters in a polymerizable monomeric solvent such as styrene, vinyl toluene, acrylates, methacrylates and the like. The unsaturated polyester itself usually is formed by the esterification of glycols with dicarboxylic acids or acid anhydrides. At least a part of the dicarboxylic acid or acid anhydride contains ethylenic unsaturation, e.g., maleic acid, maleic anhydride, fumaric acid and the like. Some of the dicarboxylic acid or acid anhydride may be free of ethylenic unsaturation, e.g., phthalic acid, isophthalic acid, terephthalic acid, adipic acid, succinic acid, phthalic anhydride and the like. The unsaturated polyester resin is dissolved in a polymerizable monomer to prepare the customary resinous compositions of the trade. Usually about 20 to 50 parts by weight of styrene and 80 to 50 parts by weight of the unsaturated polyester are mixed to formulate a typical unsaturated polyester resinous composition. On heating, such unsaturated polyester resinous compositions form three-dimensional (thermoset) polymeric bonds without substantial shrinkage through the application of heat in the presence of a suitable polymerization catalyst such as benzoyl peroxide. Customarily the thermosetting resinous compositions include suitable pigmentation to present an opaque surface when cured. The precise formulation of the unsaturated polyester resinous composition forms no part of this invention.

The principal object of this invention is to provide laminated articles and panels having attractive grained surfaces which contain deep embossing.

A further object of this invention is to provide laminated articles and panels having deeply embossed surfaces which are wear-resistant, craze-resistant and crack-resistant.

These and other objects and advantages of this invention will become apparent from the following detailed description by reference to the accompanying drawings in which:

FIGURE 1 is a cross-sectional representation of a typical laminated article assembly according to this invention including a deeply embossed molding surface;

FIGURE 2 is a cross-sectional representation including the elements seen in FIGURE 1 wherein the deeply embossed molding surface is pressed against the laminated article;

FIGURE 3 is a cross-sectional representation of the product laminated article of FIGURES 1 and 2 after the deeply embossed molding surface has been removed; and FIGURE 4 is a perspective representation of a typical deeply embossed laminated article according to the present invention.

Referring to FIGURE 1, there is shown a structural backing element 10 which may comprise a sheet of wood, a sheet of cement, a sheet of glass, a sheet of metal, a sheet of reinforced plastic and the like. A sheet 11 of open connected cellular foamed polyurethane is applied over one surface of the structural backing element 10. The foamed polyurethane is saturated with a non-foaming thermosetting resinous composition 12 in liquid form. Unsaturated polyester resins and epoxy resins are preferred.

A molding element 13 is provided with deep grooves 14 in its undersurface. The molding element is pressed against the structural backing element 10 as seen in FIGURE 2 whereby the readily compressible foamed polyurethane is compressed and fills the deep grooves 14 in its saturated condition. While the foamed polyurethane sheet 11 is maintained under compression as described, the thermosetting resinous composition 12 is cured to a hardened thermoset condition. The foamed polyurethane sheet 11 is confined within the cured resin and abuts the outer surface thereof over its entire area. The surface abutment of the foamed polyurethane provides an attractive grained surface presentation. The amount of flattening of the polyurethane foam sheet corresponds to the embossments of the embossed molding surface 14.

When the molding element 13 is removed from compressive contact, as seen in FIGURE 3, the hardened resinous composition retains the shape of the molding element 13. The deep grooves 14 of the molding element 13 leave an embossed resinous surface 15.

The variety of embossing configurations which can be achieved with the present invention is limitless. One specific example is illustrated in FIGURE 4 where the embossed surface includes a letter "A." As seen in FIGURE 4, the structural backing sheet 10 has a generally uneven outer surface 16 as might be anticipated with a wooden or cement material. The readily compressible foamed polyurethane fills in the unevenness of the surface 16 and at the same time expands into a set of grooves in a molding element (not shown) corresponding to the letter "A" 17. On curing of the resinous composition, the cured coating 15 has the configuration of the letter "A" set out in the attractive fine-grained surface presentation.

Where the foamed polyurethane has a selected color (e.g., red, green, blue, et cetera) and the thermosetting resinous composition has a contrasting color (e.g., white, gray, buff, et cetera) the fine lines of the foam configuration are interspersed through a general background of the thermosetting resinous composition coloring in a visually pleasing manner.

*Examples*

(1) A sheet of plywood ³⁄₁₆-inch thick was used as a structural backing element. A sheet of foamed polyurethane having open connected cells was applied to one surface of the plywood. The foamed polyurethane was green and had approximately 60 cells per inch. The foamed polyurethane was one-half-inch thick in its uncompressed state. A white-colored (through suitable pigmentation) unsaturated polyester resinous composition (glycol-maleate-phthalate in styrene solution) was applied to the foamed polyurethane sheet and a deeply embossed molding element (steel) was pressed against the resin-saturated foamed polyurethane sheet. With the molding element maintained in compressive engagement with the foamed polyurethane, the unsaturated polyester resin was allowed to cure into a hardened thermoset condition. Upon removal of the molding element after resin-cure, the deeply embossed configuration of the molding element was observed in the surface of the resulting laminated panel. The grained surface was an attractive white background with fine green lines presenting the appearance of fine grain dyed leather.

When the resulting laminated panel was subjected to severe flexural stresses, the surface resisted cracking and crazing to a significantly greater degree than a similar surface which contained merely the unsaturated polyester resin without compressed foamed polyurethane.

The laminated panel of Example 1 was struck with a hammer on the side of the plywood (reverse impact). The hammer blow developed a small star-craze which was visible through the resinous surface but did not develop actual cracks in the surface. A similar treatment of a laminated panel without foamed polyurethane sheets compressed therein developed a more severe star-craze which broke through the resinous surface.

(2) Example 1 was repeated with the following exceptions:

(a) The foamed polyurethane sheet was neutral in color, i.e., slightly amber;

(b) The unsaturated polyester resin was colorless.

The cured laminated panel contained a deeply embossed surface through which the grain of the plywood structural backing member could be viewed.

(3) The foamed polyurethane of Example 1 was applied to a sheet of cold-rolled steel and saturated with an epoxy resin (DER–332, a resin having an epoxy equivalent of about 350). On curing, the green lines of the foamed polyurethane could be seen in the generally white background of the cured epoxy resin. The bonding with the steel sheet was excellent.

I claim:

1. A laminated article comprising a structural backing member and at least one layer of flexible foamed polyurethane having open connected cells, said polyurethane sheet being impregnated with a non-foaming thermoset resinous material which has been cured to a hardened thermoset condition while the said foamed polyurethane sheet was maintained at least in part under compression between the said backing member and an embossed molding element whereby the resulting laminated article has an embossed surface corresponding to that of the said molding element, said surface having the said foamed polyurethane in abutment therewith over its entire area, and the said foamed polyurethane is substantially flattened from its initial uncompressed thickness, the amount of such flattening corresponding with the embossments of the said embossed surface.

2. The laminated article of claim 1 wherein the said foamed polyurethane sheet has open, connected cells of substantially uniform diameter in the range of 0.001 to 0.5 inch.

3. The laminated article of claim 1 wherein the said sheet of foamed polyurethane has a normal uncompressed thickness from 0.05 to 2.0 inches.

4. The laminated article of claim 1 wherein the said thermosetting resinous composition is unsaturated polyester resin.

5. The laminated article of claim 1 wherein the said thermosetting resinous composition is an epoxy resin.

6. The laminated article of claim 1 wherein the said thermosetting resinous composition is opaque and the said foamed polyurethane sheet has a coloring which is different from that of the said thermosetting resinous composition whereby a fine-grained surface presentation appears in the surface of the said laminated article.

7. The method of forming a laminated article having an embossed surface which comprises forming a sandwich of a structural backing member and a sheet of flexible foamed polyurethane having open, connected cells, impregnating the said sheet of polyurethane with a non-foaming thermosetting resinous composition in liquid form, compressing the said sheet of foamed polyurethane between the said backing member and an embossed molding element, whereby the said foamed polyurethane conforms substantially entirely to the configuration of the said embossed molding element, and curing the said resinous composition to a hardened thermoset condition while maintaining the said foamed polyurethane sheet under compression, and removing the said embossed molding element whereby an embossed laminated article is presented having an embossed surface corresponding to the said embossed molding surface and having the said polyurethane in abutment with the said surface over substantially its entire area, the said polyurethane being substantially flattened from its initial uncompressed thickness, the amount of such flattening corresponding with the embossments of the said embossed surface.

8. The method of claim 7 wherein the said foamed polyurethane has substantially uniform cells of average diameter in the range of 0.001 to 0.5 inch.

9. The method of claim 7 wherein the said foamed polyurethane has an uncompressed thickness in the range of 0.5 to 2.0 inches.

10. The method of claim 7 wherein the said thermosetting resinous composition is unsaturated polyester resin.

11. The method of claim 7 wherein the said thermosetting resinous composition is an epoxy resin.

12. The method of claim 7 wherein the said thermosetting resinous composition is opaque and the said foamed polyurethane sheet has a coloring which is different from that of the said thermosetting resinous composition whereby a fine-grained surface presentation appears in the surface of the said laminated article.

13. The method of forming a laminated article having an embossed surface which comprises forming a sandwich of a structural backing element and a sheet of foamed resin having open, connected cells, being flexible, elastic, highly compressible and wettable with a thermosetting resinous composition in liquid form, impregnating the said sheet of foamed resin with a wetttable non-foaming thermosetting resinous composition in liquid form, compressing the said sheet of foamed resin between the said backing element and an embossed molding element whereby the said sheet of foamed resin conforms substantially to the configuration of the said embossed molding element, and curing the said thermosetting resinous composition to a hardened thermoset condition while maintaining the said sheet of foamed resin under compression, and removing the said embossed molding element whereby an embossed laminated article is presented having an embossed surface corresponding to the said embossed molding element and having the said foamed resin in abutment with the said surface over substantially its entire area, the said foamed resin being substantially flattened from its initial uncompressed thickness, the amount of such flattening corresponding with the embossments of the said embossed surface.

References Cited by the Examiner

UNITED STATES PATENTS

| | | | |
|---|---|---|---|
| 2,596,364 | 5/52 | Brennan | 264—128 X |
| 2,782,458 | 2/57 | Emmert et al. | 156—313 X |
| 2,817,619 | 12/57 | Bickel et al. | 156—245 |
| 2,863,797 | 12/58 | Meyer. | |
| 2,905,580 | 9/59 | Kreier | 161—413 X |
| 2,927,876 | 3/60 | Hopp et al. | 161—159 X |
| 2,959,511 | 11/60 | Finger. | |
| 3,006,799 | 10/61 | Adams et al. | 161—88 X |
| 3,042,545 | 7/62 | Kienle et al. | |
| 3,108,030 | 10/63 | Taylor | 156—332 |

FOREIGN PATENTS 1,248,624   11/60   France.

EARL M. BERGERT, *Primary Examiner.*

CARL F. KRAFFT, *Examiner.*